Jan. 15, 1929.
R. GILES ET AL
1,699,186
AUTOMATIC THREADING CHUCK
Filed July 30, 1925
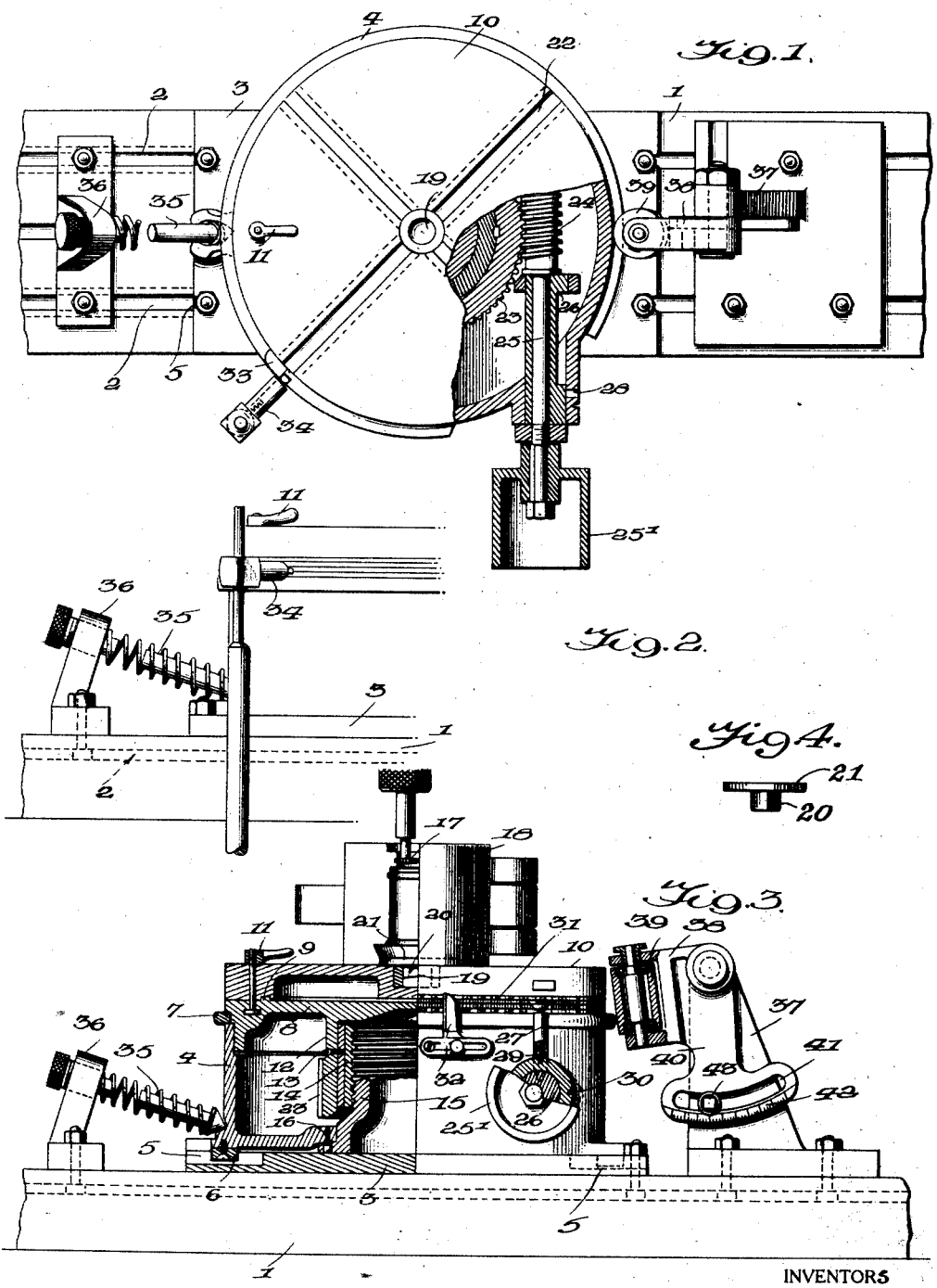
INVENTORS
AND Reed Giles,
Robert McWilliams
BY Eccleston & Eccleston
ATTORNEYS Patented Jan. 15, 1929.

1,699,186

UNITED STATES PATENT OFFICE.

REED GILES AND ROBERT McWILLIAMS, OF WASHINGTON, PENNSYLVANIA, ASSIGNORS TO HAZEL-ATLAS GLASS CO., OF WHEELING, WEST VIRGINIA, A CORPORATION OF WEST VIRGINIA.

AUTOMATIC THREADING CHUCK.

Application filed July 30, 1925. Serial No. 47,010.

This invention relates to apparatus for cutting threads, either continuous or interrupted, and has special reference to a chuck for use in cutting such threads in molds employed in the manufacture of glassware such as jars, bottles and the like.

Prior to the present invention it has been the custom to cut threads in such molds by means of the ordinary lathe, but such method has proved unsatisfactory due to the fact that extreme exactitude was necessary in order that the molds should be uniformly cut. It is therefore an object of the present invention to provide a mechanical attachment for a milling machine by means of which the threads may be expeditiously and economically cut on a mold with great accuracy, and which will duplicate the threads on succeeding molds without variation.

Another object of the invention resides in the provision of such an attachment which will cut threads on either cylindrical or tapered surfaces.

Other objects and advantages of the invention will be apparent from the following description when taken in connection with the accompanying drawings, in which:

Figure 1 is a fragmentary plan view of a milling machine with the attachment in place thereon, parts being broken away.

Figure 2 is a fragmentary detail of the stop mechanism.

Figure 3 is a side elevation of the attachment, partly in section; and

Figure 4 is a side elevation of a detail.

More specifically, the numeral 1 indicates the bed of an ordinary milling machine provided with the T-head slots 2 to which is bolted the base plate 3 of the present invention.

The main or body portion of the threading chuck consists of a cylindrical casing or base portion 4 which is slidably connected to the base plate 3 for a purpose to be hereinafter described. This sliding connection is attained by means of grooves or slots 5 in opposite ends of the base plate which form guideways for the gibs 6 secured to the bottom of the casing 4.

Rotatably mounted on the upper edge of the casing 4, and provided with a bearing ring 7, is a head 8. This head is provided with an annular rib 9 on its upper face which is received in a complementary groove in the under surface of the work-table 10 and prevents lateral movement thereof while permitting circumferential adjustment of the work-table with respect to the head 8. A lock 11 is provided for securing the table in adjusted position.

Depending centrally from the head 8 is a sleeve 12 to which is detachably connected by means of set screws 13 an internally threaded member 14 for cooperation with the externally threaded member 15. This threaded element 15 is detachably connected to the casing 4 by means of screw bolts 16. The purpose of this threaded connection between elements 14 and 15 is to cause the work-table and the work carried thereby to rise as the table is rotated, thus causing the milling tool 17 to cut a thread in the work corresponding to the pitch of the threaded members 14 and 15; and by providing detachable connections for these threaded members it will be apparent that other threaded elements having a different pitch may be substituted thus varying the pitch of the thread to be cut in the work.

A mold such as those for which the present invention is intended is indicated by the numeral 18. These molds comprise two hinged sections between which a bottom mold section is clamped when the mold is in use. In order to center this mold on the work-table the latter is provided with a central cavity 19 adapted to receive a boss 20 formed on the under surface of the disc 21. A variety of sizes of these discs may be kept in stock to cooperate with various sizes of molds. It will be understood, of course, that the molds are clamped about the disc. The work-table 10 is also provided with grooves 22 adapted to receive clamps (not shown) to assist in securing the work to the table.

For the purpose of rotating the head 8 and table 10 the sleeve 12 is provided with a worm gear 23 which meshes with a worm 24 carried by the horizontally disposed shaft 25 mounted in the eccentrically disposed bearing 26. This bearing is provided with a radially disposed handle 27 which extends through a slot 28 in the casing 4, and is provided with a spring detent 29 for locking engagement with the notches 30. By this construction it will be apparent that the worm may be locked either into or out of engagement with the worm wheel 23, as desired. In the position shown in Fig. 1 the worm and worm wheel are in mesh, but if the handle 27 and eccentric bearing 26 are given a partial turn it will be apparent that the worm 24 will be disengaged from the teeth 23. For the purpose of rotating shaft 25 a pulley 25' is fixedly connected thereto.

In some classes of work the molds are provided with continuous threads while in other types interrupted threads are required. Accordingly, the periphery of the work-table 10 is provided with graduations 31 from 0° to 360° while the casing 4 has a pointer 32 for cooperation therewith. By this means and with the employment of a knockout block 33 carried by the table 10 which is adapted to engage the release nut lever 34 of the milling machine, threads of various lengths may be cut as will appear in the description of the operation found hereinafter. The specific structure of the nut lever 34 is not shown since per se it forms no part of the present invention.

In certain types of glassware tight seals are required, and in such cases it is usual to taper that portion of the glassware on which the threads are formed. The present invention, therefore, has been designed to cut threads on molds having tapered surfaces. To this end a spring pressed bolt 35 is slidably mounted in the standard 36 which is bolted to the milling machine and has its free end in engagement with the casing 4 thereby normally holding the casing 4 at one limit of its movement in the slots 5. Also bolted to the milling machine at a point diametrically opposed to the spring bolt 35 is a standard 37 to which is pivoted an arm 38 carrying a roller 39 which forms an abutment against which the ring 7 contacts when this part of the apparatus is in use. The arm 38 is provided with an extension 40 which is slotted and provided with graduations as indicated by numerals 41 and 42 respectively. It will thus be observed that by adjusting the slot with respect to the set screw 43 the angle which the roller 39 makes with the vertical may be varied so as to correspond with the taper of the mold wall.

In the operation of this part of the invention just described it will be apparent that as the table is caused to rise, due to the threaded elements 14 and 15, the ring 7 will ride against the inclined roller 39 thus forcing the chuck to the left (Fig. 3) and permitting the milling tool to cut a thread of uniform depth on the tapered wall of the mold.

Having described in detail the construction of the threading chuck we will now proceed to set forth the operation thereof. Assuming that threaded elements 14 and 15 of the proper pitch have been placed in the chuck and further assuming that it is desired to cut four interrupted threads—the mold 18 is clamped around a disc 21 of proper size and which has been previously mounted on the work-table 10. Lock 11 is now released and the table rotated until the 0° of the graduations register with the pointer 32 and the table again locked to the head 8. The knockout block 33 is thus positioned to contact with the release nut lever 34 at the proper time, and the handle 27 is swung so as to move the worm 24 into mesh with the worm wheel 23. The cutting operation is now started and the table caused to rise, through the medium of the threaded elements 14 and 15, as it is rotated. After the table has traveled through 90° the knockout block 33 will engage the release nut lever 34 and further operation of the milling tool is stopped. The handle 27 is now thrown over to disengage the worm 24 and the table is reversely rotated so as to lower the same to the starting position. Lock 11 is then loosened and the table 10 rotated so as to bring the 90° graduation into registration with the pointer 32, and the work-table again locked. The machine is then again set in operation as before and these operations are repeated until all of the threads are cut. It will be understood, of course, that the length of the threads and their number may be varied as desired. If, for instance, only three threads were required the table could be set at 0°, 120° and 240°.

In the foregoing operation of the machine it was assumed that the mold had a cylindrical interior of uniform diameter and the abutment or roller 39 therefore was unnecessary and could be swung to one side and secured by means of the adjustment 43. Where threads are to be placed on a tapered surface however, the roller is adjusted to a position having an angle with the vertical equal to the taper on the mold. The machine is then operated as above described and due to the roller 39 the work is moved to the left (Fig. 3) against the pressure of plunger 35, thus causing the milling machine to cut a thread of uniform depth on the tapered surface.

From the foregoing description taken in connection with the accompanying drawings it will be apparent that we have devised an attachment for ordinary milling machines which adapts the same to cut either continuous or interrupted threads upon cylindrical or inclined surfaces; that the pitch of the threads to be cut may be easily varied by merely substituting other master threads for those previously attached to the chuck; and that such threads may be duplicated on a plurality of molds without variations. The attachment is therefore especially useful in connection with forming of threads on molds for glassware and the like where a high degree of exactitude and uniformity is of the utmost importance; although obviously it may be used for a variety of purposes.

In accordance with the patent statutes we have described what we now believe to be the best embodiment of the invention, but we do not wish to be understood thereby as limiting ourselves or the scope of the invention, as many changes and modifications may be made without departing from the spirit of the invention; all such we aim to include in the scope of the appended claims.

What we claim as new and desire to secure by Letters Patent is:

1. A threading chuck for milling machines including a base portion, a head, a work-table mounted on said head against axial movement with respect thereto but for circumferential adjustment, releasable means for locking said work-table with respect to said head, said work-table and head provided with graduations, a pointer on said base portion for cooperation with said graduations, and cooperating threaded elements for causing a rectilinear movement of the work-table and head as the same are rotated.

2. A threading chuck for milling machines including a slidably-mounted base portion, a work-table threaded thereto, means for rotating said table, means normally holding said base portion at one limit of its sliding movement, means for causing said base portion to move toward its other limit of movement as the work-table is rotated, and means for varying the extent of said movement.

3. A threading chuck for milling machines including a slidably-mounted base portion, a work-table threaded thereto, means for rotating said table, a spring-pressed plunger engaging said base portion and normally holding said base portion at one limit of its sliding movement, means for causing said base portion to move toward its other limit of movement as the work-table is rotated, and means for varying the extent of said movement.

4. A threading chuck for milling machines including a slidably-mounted base portion, a work-table threaded thereto, means for rotating said table, a spring-pressed plunger engaging said base portion and normally holding said base portion at one limit of its movement, and an inclined abutment bearing on said work-table and adapted to cause a sliding movement thereof as the table is rotated.

5. A threading chuck for milling machines including a slidably-mounted base portion, a work-table threaded thereto, means for rotating said table, means normally holding said base portion at one limit of its sliding movement, and a rotatably-mounted roller having bearing on the side of said table and inclined with respect thereto.

6. A threading chuck for milling machines including a slidably-mounted base portion, a work-table threaded thereto, means for rotating said table, means normally holding said base portion at one limit of its sliding movement, an arm pivoted adjacent said table, a roller carried by said arm and bearing on the periphery of said table, and means for positioning said roller at varying angles with the vertical.

7. A threading chuck for milling machines including a plate, a casing slidably-mounted thereon, a head threaded to said casing, a work-table mounted for circumferential adjustment on said head, means for rotating said head comprising a worm wheel on said head and a worm meshing with said worm wheel, an eccentric bearing for said worm, and means for adjusting said bearing to move said worm into and out of engagement with said worm gear.

8. A threading chuck for milling machines adapted to hold a partible glass mold and including rotatable work-table having grooves for the reception of clamping elements, and a disc detachably secured centrally of said work table and around which the mold is clamped by the clamping elements.

9. A threading chuck for milling machines including a slidably-mounted base portion, a head rotatably mounted on said base portion, a work-table mounted on said head against axial movement and provided with a series of graduations, said work-table being circumferentially adjustable with respect to said head, means for rotating said head and work-table, and cooperating threaded elements detachably connected to said base portion and head, whereby other threaded elements having single or multiple threads of varying pitch may be substituted.

10. A threading chuck for milling machines including a base portion, a head rotatably mounted on said base portion, an unthreaded work-table mounted on said head for circumferential adjustment, said head and said work-table each provided with an annular series of graduations, and a finger on said base portion for cooperation with the two series of graduations.

REED GILES.
ROBT. McWILLIAMS.